United States Patent

[11] 3,580,055

[72] Inventor Richard B. White
 Orchard Lake, Mich.
[21] Appl. No. 770,763
[22] Filed Oct. 25, 1968
[45] Patented May 25, 1971
[73] Assignee Kent-Moore Corporation
 Warren, Mich.

[54] TANK SYSTEM TIGHTNESS TESTER
 15 Claims, 3 Drawing Figs.
[52] U.S. Cl. .................................................... 73/49.2,
 73/292
[51] Int. Cl. ...................................................... G01m 3/26
[50] Field of Search ........................................... 73/40.5,
 49.2, 290, 40, 292

[56] References Cited
 UNITED STATES PATENTS
3,466,642 9/1969 Terramorsi .................. 73/40.5X FOREIGN PATENTS
1,050,266 12/1966 Great Britain ................ 73/290

Primary Examiner—S. Clement Swisher
Assistant Examiner—William A. Henry, II
Attorney—Burton and Parker ABSTRACT: This disclosure relates to a test apparatus for measuring the tightness of tanks, such as underground fuel storage tanks, and a method of performing the test. The apparatus includes a temperature sensing device adapted to measure the temperature of the fluid within the tank, a means to establish a fluid head in communication with the fluid in the tank to measure the change in volume of fluid in the system during the test period, and a fluid circulating system which continuously circulates fluid from the tank and back to equalize the temperature of the fluid in the tank, and permit accurate compensation for temperature variations in the system. In the disclosed embodiment, a means is provided to adjust the height of the fluid head to stabilize the deflection of the walls of the tank.

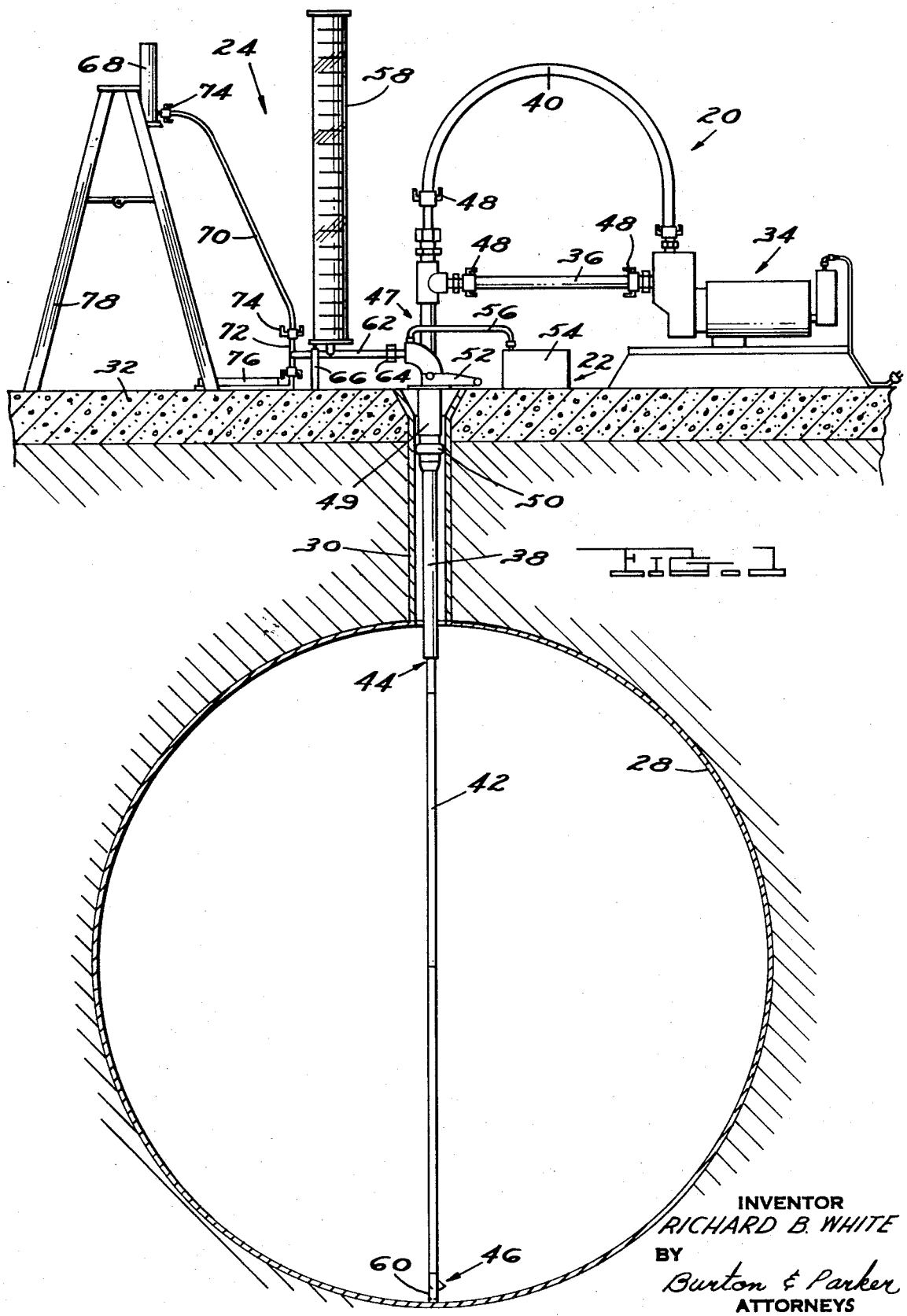

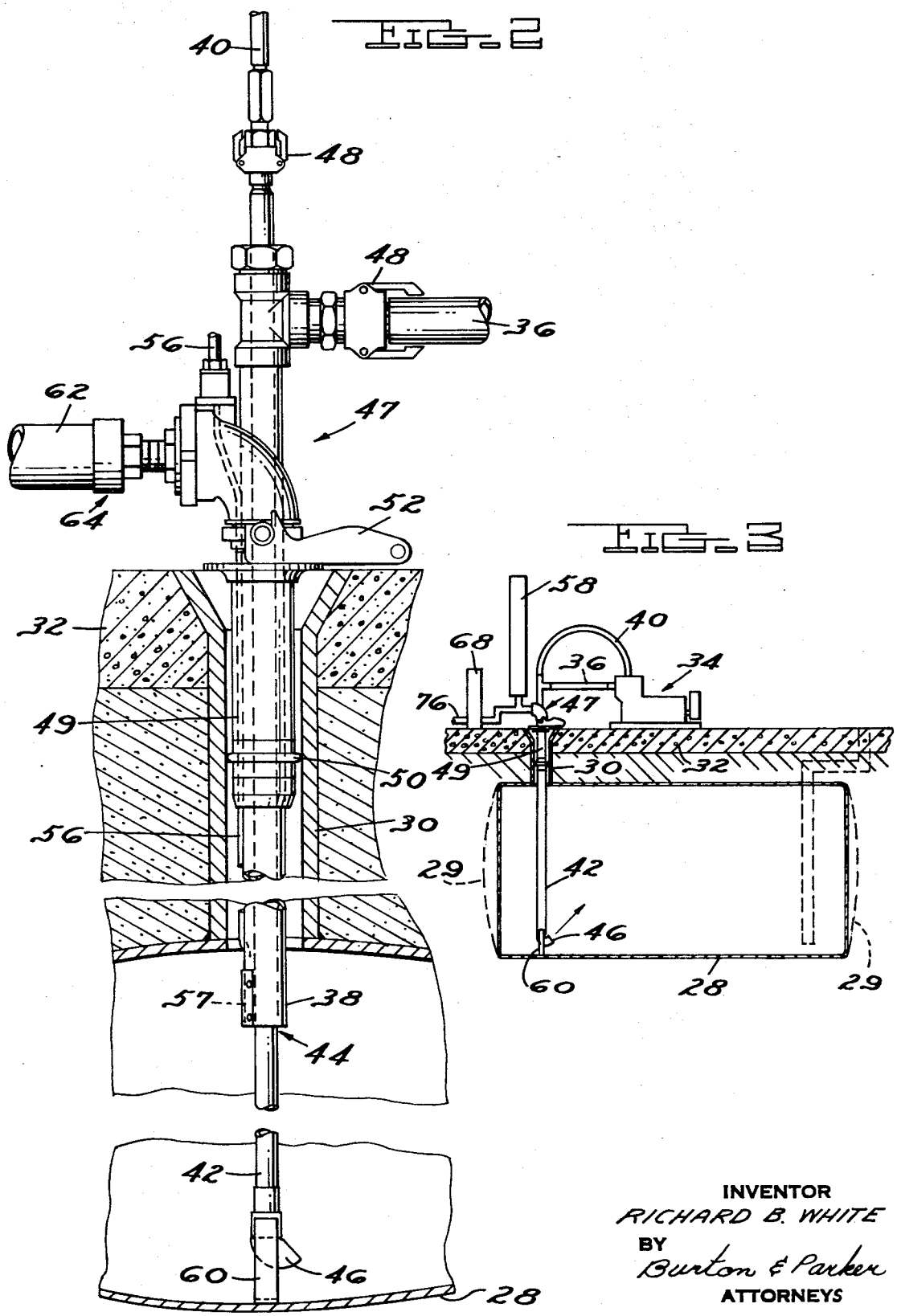

TANK SYSTEM TIGHTNESS TESTER

The method disclosed herein includes continuously circulating the fluid within the tank to equalize the temperature, extending a temperature sensing device into the fluid, and maintaining a static fluid head in communication with the fluid within the tank, and periodically measuring the change in the height of the fluid head. The test procedure may also include compensating for the deflection of the walls of the tank by establishing a static fluid head greater than the testing head, prior to measurement of the change in volume.

FIELD OF THE INVENTION

The test apparatus and method of this invention was primarily developed to test the tightness of underground fuel storage tanks, such as the gasoline storage tanks used by gasoline stations and the like, where the accessibility to the tanks is restricted. The apparatus and method disclosed herein is, however suitable for testing the tightness of many types of fluid enclosures or tanks, and the invention is not considered limited to underground fuel tanks. The invention is described herein in relation to an underground fuel storage tank for convenience of description only.

DESCRIPTION OF THE PRIOR ART

The testing of underground fuel storage tanks has become increasingly more important as the number of underground tanks has increased, especially over the last ten years. The method of testing the tightness of underground storage tanks has however not materially improved.

The testing method presently used includes filling the underground fuel tank with product from a tank truck, then connecting a standpipe having a transparent sight glass, or the like, to the fill pipe, and filling it to a predetermined test level. If the column of fluid in the sight glass drops over a given amount in the test period, the tank is not considered tight. Some efforts have been made to correct the changes in volume measured for variations in temperature of the fuel, however the temperature of the fuel in the tank varies considerably at different levels, and the temperature of the product in the tank truck is generally not the same as the temperature in the underground tank. It is therefore generally not possible to obtain an accurate temperature correction factor, and the test is not considered sufficiently accurate to detect small leaks, as required by existing safety standards.

A similar procedure has also been previously utilized to determine the tightness of other enclosure or containers, such as the bulkhead of a ship. U.S. Pat. Nos. 2,531,607, and 2,853,874 disclose such procedures.

SUMMARY OF THE INVENTION

The invention disclosed herein is characterized as a "tank system tightness tester," rather than a "leak detector," because the test procedure is adapted to determine whether a tank or enclosure is "tight" within the standard imposed. If the tank system is not tight, it is obviously leaking, however the title is intended to indicate a difference in approach to the problem. Studies have indicated that leakage generally results from electrolitic or chemical corrosion, after the tank has been buried in the ground, or failure to properly install and maintain the tanks and piping system to assure that there is no direct leaking. The rate of corrosion will of course depend upon the chemical makeup of the soil, the material used for the tank, the care and maintenance given the storage tank, and the fluid contained within the tank. It is therefore not possible to accurately estimate an average life for a particular storage tank.

The tank system tightness tester and method of this invention compensates for the two major sources of error in the presently used method which simulate leaking; the variations in the temperature of the fluid in the tank system, and the deflection of the walls of the tank after the tank has been filled. The temperature of the fluid is equalized in this invention by circulating the fluid in the tank, and the temperature is accurately measured at time intervals during the test procedure. The deflection of the walls of the tank to be tested is stabilized by providing a means to maintain a static fluid head, in communication with the fluid in the container, and greater than the fluid head maintained during testing; thereby reducing the time required to reach equilibrium of the deflection of the tank walls.

The apparatus of this invention includes a means to measure the temperature of the fluid within the tank to be tested, a means to measure the change in volume of the fluid over the test interval, and a fluid circulating system which continuously removes fluid from the tank to be tested and returns the fluid to the tank. The fluid circulating system includes a discharge nozzle located in proximity to the bottom of the tank to be tested, and an inlet preferably spaced from the discharge nozzle, located in this embodiment adjacent the top of the tank. The discharge nozzle, in the disclosed embodiment, is directed at approximately a 45° angle from the bottom of the tank, and the tank axis, to improve the circulation of the fluid within the tank, and assure a homogeneous fluid temperature. Because the access to the underground storage tank is generally limited to the fill pipe, the discharge tube in the disclosed embodiment is substantially coaxially aligned with the inlet tube, and is received within the inlet tube to conserve space. The temperature sensing means, which may be a thermistor or the like, is preferably located adjacent or in the circulating system inlet to assure accurate measurement of the temperature of the fluid in the tank, and in the piping system.

In the disclosed embodiment of this invention, the apparatus includes a first calibrated graduate and/or standpipe in communication with the fluid in the tank, which is adapted to maintain a predetermined static fluid head during testing. A smaller second graduate is preferably provided in communication with the first to accurately adjust the level of the static fluid head to a height greater than the test height until equilibrium in the deflection of the walls of the container has been nearly attained, and to measure the change in volume. After equilibrium has been nearly reached at the greater pressure, the static fluid head may be reduced to the test level.

The importance of compensating for temperature variations within the fluid system, and the deflection of the walls of the container, may be illustrated by a few examples, taking gasoline as a standard. A standard (NFPA No. 329, National Fire Protection Association) of 0.05 gallons per hour has been established as a maximum loss permitted in an underground storage tank, and it will be seen that this loss may not even be detected without accurate correction for temperature and pressure. The coefficient of expansion for gasoline is 0.0006 percent per degree Fahrenheit. Therefore, a change of 1° Fahrenheit results in a 0.6 gallon change in the volume of a 1,000-gallon tank of gasoline; 3 gallons in a 5 thousand gallon tank; and 6 gallons in a 10,000-gallon tank. In view of the fact that the capacity of underground storage systems generally range in size from 300 gallons to 30,000 gallons, it is necessary to accurately determine the temperature of the system to obtain measurements within the standard referenced above. It has been previously suggested that the temperature of the product in underground storage tanks would equalize if sufficient time is given, such as overnight. Data collected from underground storage tanks indicate that this is seldom, if ever true. The difference between the temperature of the delivered product, and the fuel in the underground tank requires several days to equalize. Further, the underground temperatures change in response to hourly, daily, and seasonal changes in the above ground temperatures. Testing has also indicated that the temperature of the fluid within a tank may never become uniform. In summer, for example, stratification may occur with gasoline, resulting in "layers" at different temperatures. The difference between the temperature of the bottom layer and the top layer generally is several degrees. The temperature may also vary from the shell to the center of the tank.

The pressure exerted by the fluid in the tank, on the ends of the tank, is considerable, and may also result in a source of error which simulates leaking of the tank. For example, the gasoline in a tank having a 5-foot diameter will exert 1.58 tons of pressure on the ends of the tank; a 10-foot diameter tank will exert 3.16 tons of pressure, and a 15-foot tank will exert 4.74 tons. The pressure will, of course, depend upon the specific gravity of the fluid contained. The pressure will therefore be greater for kerosene, fuel oil, and water. The deflection of the end walls will result in an apparent loss of fluid in the system. For example, a tank having a diameter of 96 inches will initially have a head deflection of 0.125 inches, which results in an apparent loss of 3.92 gallons of fuel. It is therefore necessary to compensate for the deflection of the walls of the tank when calculating the change in volume of the system during the test procedure, or considerable time will be required before equilibrium is reached.

The method of testing the tightness of a fluid tank of this invention includes the steps of circulating the fluid within the tank to equalize the temperature of the fluid, extending an accurate temperature sensing means into the fluid to measure the temperature, maintaining a static fluid head in communication with the fluid in the tank, and measuring the change in the height of the fluid head. In the disclosed test procedure, the tank is filled to capacity with product from a tank truck or the like, and a graduate, in communication with the fluid in the tank, is filled with fluid above a predetermined test level. A second graduate, located above the first graduate, and communicating therewith, may be utilized for this portion of the test. The height of the column of fluid within the first graduate may then be reduced to the predetermined testing level, after the deflection of the walls of the tank has nearly stabilized at the greater pressure. The change in the height of the fluid column within the graduate, from the testing level, is then determined at predetermined time intervals, and the temperature is simultaneously measured within the tank. A temperature correction factor is used to determine if the tank is tight.

Other advantages and meritorious features will more fully appear in the following description of the preferred embodiment, claims and accompanying drawings, wherein:

FIG. 1 is a side view of the apparatus of this invention, including an end cross-sectional view of an underground storage tank;

FIG. 2 is an enlarged side view, partly in section, of a portion of the apparatus shown in FIG. 1; and FIG. 3 is a side view of the apparatus shown in FIG. 1, including a longitudinal section through the storage tank.

The test apparatus disclosed in FIG. 1 includes a fluid circulating system indicated generally at 20, a temperature sensing and reading system indicated at 22, and means 24 adapted to indicate changes in the volume of fluid within the tank system, and accurately adjust the height of the static fluid head. The tank 28 may be a conventional underground storage tank, which is generally cylindrical, and may vary considerably in size. It will be understood, however, that the apparatus and method disclosed herein is also suitable for testing the tightness of various fluid enclosures, as described hereinabove. The fuel storage tank is provided with a fill pipe 30, and may be covered by asphalt 32, or the like, as required by the installation.

The fluid circulating system 20 includes a modified conventional pump 34, a pump inlet tube 36 in communication with a suction tube 38 extending into the tank, and a pump outlet tube 40 communicating with a discharge tube 42. The function of the fluid circulating system is to mix the product in the tank, and "equalize" the temperature of the fluid to permit accurate calculation of the change in volume of the system, as described hereinbelow. The pump draws the fluid into the suction tube 38 at 44, where it circulates through the pump inlet tube 36, through the pump outlet tube 40, and into the discharge tube 42. The discharge tube extends to adjacent the bottom of the tank, where it terminates in a discharge nozzle 46. The discharge nozzle is directed at approximately a 45° angle from the bottom and axis of the tank, as shown in FIGS. 1 to 3, to aid in the circulation of the product within the tank, and assure that the temperature of the fluid is uniform throughout. The angle of the discharge nozzle creates a maximum swirling action in the tank which thoroughly mixes the product.

The discharge nozzle 46 is preferably spaced from the inlet 44 of the suction tube to prevent direct circulation from the discharge tube into the inlet, and assure proper circulation. In this embodiment of the invention, the suction tube 38 is received over the discharge tube 42, providing an annular opening in the suction tube. The coaxial alignment of the suction and discharge tubes permits utilization of a single sealing member, and receipt of the tubes in the fill pipe 30. The inlet and outlet tubes of the pump are connected to a test elbow 47 by quick connect couplings 48, or the like. Quick connect couplings may also be provided at the opposite ends of the tubes for connection to the pump. The test elbow is received in an adapter 49, if required, having an expandable annular seal 50 which is compressed against the inner walls of the fill pipe by a handle 52, as shown more clearly in FIG. 2.

The pump may be a modified conventional fluid pump, however an explosion proof centrifugal pump is preferred where the tank contains a flammable fluid, such as gasoline or fuel oil. A transparent pump entrance tube 36 is also preferred to aid in the elimination of entrained air from the system, which could result in a false reading of the volume measured.

The temperature sensing and reading system 22 includes an accurate temperature reading instrument 54, and a temperature sensing means located within the tank and connected to the reading instrument by an insulated electrical connector 56 extending through the test elbow 47. In this embodiment of the invention, the sensing means 57 is located at the entrance 44 to the suction tube, as shown in FIG. 2, and is exposed to the "flow-past" of the product circulating in the tank, and to the incoming suction stream.

The temperature sensing and reading system must be very accurate to insure accurate measurement of volume changes within the system. The present embodiment utilizes thermistor for the temperature sensing means, which is a semiconductor having a large temperature coefficient of electrical resistance. The temperature reading instrument includes a low voltage battery supply, read out circuitry, and instruments. The present embodiment utilizes a Wheatstone bridge circuit, sensitive to temperature variations of less than 0.02° Fahrenheit.

The changes in the volume of fuel in the system is measured in a calibrated standpipe 58. The standpipe is connected to the test elbow 47, as shown in FIGS. 1 and 2, through a pipe 62 and union 64. After the tank is filled with product, the standpipe is filled, from the top, to establish a static fluid head in communication with the product in the tank. A change in height of the fluid head indicates a change in volume of the fluid in the system, after correction for temperature and pressure. In this embodiment, the supporting legs 66 of the standpipe may be adjusted to level the standpipe for more accurate measurement of the height of the fluid column. A smaller, and therefore more accurate calibrated cylinder or graduate 68 may also be provided to adjust the height of the fluid column in the standpipe, as described more fully hereinbelow. The calibrated cylinder is connected to a "T" coupling 72, in communication with the standpipe through tube 70. Quick connect couplings 74 may be provided at opposite ends of the tube to simplify the assembly, and the tube 70 is preferably transparent to eliminate air in the system, as described hereinabove. The opposite end of the "T" coupling in this embodiment is connected to a bleed line 76 to aid in the removal of fluid from the standpipe 58. Where fluid is to be added to the standpipe, it may be necessary to elevate the graduate 68, and a ladder 78 may be provided for supporting the cylinder, as shown in FIG. 1.

The function and operation of the test apparatus will be more fully understood from a description of the test procedure. The first step in the test is normally to calculate the volume of the tank, and the volume of water, if any, in the bottom of the tank. For the purposes of this example, it will be assumed that the test is being conducted on a 10,000-gallon gasoline tank. The volume of the tank is calculated for use in the temperature correction, which must be made later in the test. The depth of the tank is also important when installing the discharge tube, as described hereinbelow. The temperature correction factor for a 10,000-gallon tank is 10,000 thousand gallons × 0.0006 percent per degree Fahrenheit, or 6 gallons per degree Fahrenheit. The tank is then filled to capacity from a tank car, or the like. It is preferable to take temperature readings of the tank car and the underground tank, prior to filling, to simplify temperature measurement later in the test.

The insert adapter 49, is required, is inserted into the fill pipe 30, and the handle 52 is depressed to expand the seal 50, and seal the adapter in the fill pipe. The discharge tube 42 is then assembled and inserted in the fill pipe, through the adapter 49, until the end 60 rests against the bottom of the tank, as shown in FIG. 2. The test elbow 47 is received over the discharge tube 42, and lowered until the inlet 44 extends into the tank as shown in FIG. 1. The above ground end of the discharge tube is marked to indicate the direction of the discharge nozzle 46, and the discharge tube is rotated to direct the nozzle at a 45° angle from the end and axis of the tank. The pump 34 is then positioned as shown in FIG. 1, and the inlet and outlet tubes, 36 and 40 respectively, are connected to the test elbow 47 as shown. The fluid circulating system is now ready for operation. It may be necessary to bleed air from the system, which will appear in the clear inlet tube 36 of the pump.

The standpipe 58 is then connected to the test elbow 47 by connecting the tube 62 to the union 64, as shown in FIGS. 1 and 2. The graduate 68 and bleed line 76 may be connected at this time, however the graduate will not be used until later. The standpipe is then filled from the top with product to a predetermined test level. In the present system, the standpipe is a clear plastic cylinder, calibrated in inches, and the suggested test level is 12 inches.

The thermo-sensing unit is assembled in the system by connecting the line 56 from the temperature reading device 54 to the test elbow, as shown in FIGS. 1 and 2. The thermistor sensing device 57, in this embodiment, has been previously assembled to the test elbow, as shown in FIG. 2. An accurate temperature measurement may now be made, and recorded in the log of the test.

The height of the column in the standpipe should now be checked, and the drop in the standpipe level recorded. It should be noted that under certain conditions it is possible for the level of the standpipe to increase, usually due to an increase in the temperature in the system. The level of the fluid in the standpipe is returned to the 12 inch level, if required, and the temperature is recorded. When the tank and standpipe were filled, an abnormal pressure was exerted on the ends of the tank, gradually deflecting the ends as much as the tank construction and soil conditions would allow, as shown in phantom in FIG. 3 at 29. To measure the volume of product in the expanding tank ends, and to eliminate this factor from the test as quickly as possible, an additional static pressure may be exerted on the tank ends. This is accomplished by temporarily increasing the height of the static fluid head in the standpipe 58. The graduate 68 is elevated to a position above the 48 inch or "high pressure" level in the standpipe, as shown in FIG. 1. Next, the level of the standpipe is increased by filling the graduate 68 and releasing product through line 70 into the standpipe. The volume of product added through the graduate 68 may be accurately measured because of the relatively smaller volume of the graduate 68. A one gallon graduate is used in the present test. A level in the standpipe is increased to approximately 42 to 48 inches, which will result in approximately a one pound per square inch increase in the pressure on the tank ends. The increased static fluid head is maintained until the rate of deflection of the tank ends decreases to a minimal amount, as shown by the rate of decrease in the height of the column in the standpipe 58. Product should be added to the cylinder 68, as required to maintain the increased static fluid head.

After equilibrium has been nearly attained, the height of the fluid column may be lowered to the test level of approximately 12 inches in the standpipe, and the graduate 68 may be lowered as shown in FIG. 3. The fluid in the standpipe may be removed through the bleed line 76, however the volume of fluid removed, as well as the volume of fluid previously added, should be accurately measured and recorded. The total volume of fluid in the system may then be accurately calculated.

The testing is continued by recording the change in height of the column of fluid in the standpipe, and the temperature of the circulating fluid. The change in height of the fluid in the standpipe will be directly proportional to the change in volume in the system, depending upon the diameter of the standpipe. The temperature of the fluid will be uniform throughout because of the circulation provided, and therefore the change in temperature during the test period may be utilized to accurately correct changes in volume recorded in the standpipe. It will also be noted that under certain conditions it may not be necessary to increase the static fluid head in the standpipe because the deflection of the tank walls may not be significant. Conversely, it may not be necessary to reduce the height, after increase, where equilibrium in the deflection of the walls has been reached at the greater pressure. The procedure described substantially reduces the time required to reach equilibrium in the deflection of the tank wall ends, but may not be required in all cases.

A time interval of 30 minutes between tests is normally sufficient, however shorter or longer periods may be used if required. If a loss of fluid volume is recorded in the standpipe, this change must be checked against the expected loss due to a change in the temperature of the system. For example, if a 4 gallon loss is recorded in the standpipe, and the temperature has during the same period reduced 0.666° Fahrenheit, the loss is not due to leakage of the tank, but due to the decrease in temperature. The loss due to the decrease in temperature is 0.666° Fahrenheit × 6 gallons per degree Fahrenheit, which equals approximately the 4 gallon loss recorded in the standpipe. The temperature correction factor of 6 gallons per degree Fahrenheit was calculated hereinabove. If however the loss recorded may not be attributed to a reduction in temperature, as for example when the temperature remains constant or increases, it may be assumed that the tank tested is not tight, and the tank must be repaired or replaced.

I claim:

1. A tank system tightness tester, including: means to measure the temperature of the fluid within the tank to be tested, means including a standpipe communicating with the tank to measure the change in volume of the fluid within the tank to be tested, and a fluid circulating system for continuously removing fluid from the tank to be tested and returning the fluid to the tank, thereby equalizing the temperature of the fluid throughout the tank and permitting accurate compensation for temperature changes of the fluid during measurement of volume changes.

2. The tank system tightness tester defined in claim 1, characterized in that said fluid circulating system includes a discharge nozzle positioned adjacent the tank bottom and directed at approximately a 45° angle from the bottom of the tank to be tested to improve the circulation of the fluid within the tank, and an inlet spaced from said discharge nozzle.

3. The tank system tightness tester defined in claim 3, characterized in that said discharge nozzle is directed at approximately a 45° angle from the axis of the tank.

4. The tank system tightness tester defined in claim 3, characterized in that said fluid circulating system inlet is located adjacent the top of the tank to be tested.

5. The tank system tightness tester defined in claim 1, characterized in that said fluid circulating system includes a discharge tube and a substantially coaxially aligned inlet tube.

6. The tank system tightness tester defined in claim 5, characterized in that said discharge tube is received within said inlet tube and extends to adjacent the bottom of the tank to be tested.

7. The tank system tightness tester defined in claim 1, characterized in that said tester includes a means to equalize the deflection of the walls of the tank to be tested, including means to maintain a static fluid head in communication with the fluid within the container greater than the fluid head maintained during testing, thereby reducing the time required to reach equilibrium of the deflection of the tank walls.

8. The tank system tightness tester defined in claim 1, characterized in that the means to measure the temperature of the fluid within the tank includes a temperature sensing element positioned adjacent the inlet of said fluid circulating system.

9. A tank system tightness tester, comprising: means to measure the temperature of the fluid in the tank to be tested, means to measure the change in volume of the fluid within the tank to be tested, and means to reduce the time required to equalize the deflection of the walls of the tank after filling, including a first fluid container in communication with the fluid within the tank adapted to maintain a predetermined static fluid head during testing, and a second fluid container in communication with said first container adapted to accurately adjust the height of the fluid column in the first container to maintain a greater static fluid head on the tank until equilibrium in the wall deflection has been nearly attained.

10. The tank system tightness tester defined in claim 9, characterized in that said tester includes a means to circulate the fluid in the tank to be tested to equalize the temperature of the fluid within the tank.

11. A method of testing the tightness of a fluid tank, including the following steps:
a. circulating the fluid within the tank to equalize the temperature of the fluid;
b. positioning a temperature sensing means within the fluid to measure the temperature; and
c. maintaining a static fluid head in communication with the fluid in the tank, and measuring the change in the height of the fluid head.

12. The method of testing the tightness of a fluid tank defined in claim 11, wherein the fluid is circulated by continuously pumping the fluid from the tank and returning the fluid to the tank.

13. The method of testing the tightness of a fluid tank defined in claim 12, wherein the fluid is pumped from adjacent the top of the tank, and discharged from a nozzle adjacent the bottom of the tank.

14. The method of testing the tightness of a fluid tank, wherein the deflection of the walls of the tank is equalized by initially maintaining a fluid head in communication with the fluid in the tank greater than the predetermined fluid head maintained during testing, and thereafter reducing the fluid head to the predetermined test level, and measuring the change in volume of the fluid within the tank by measuring the fluctuation of said fluid head from said predetermined level.

15. A method of testing the tightness of a fluid tank, including:
a. filling the tank to capacity with fluid;
b. equalizing the temperature of the fluid in the tank;
c. filling a graduate with fluid above the level of the tank to establish a fluid head communicating with the fluid in the tank, causing the walls of the tank to deflect;
d. reducing the fluid head in the graduate to a predetermined testing level, thereby equalizing the deflection of the walls of the tank; and
e. measuring the change in height of the column of fluid in the graduate from the test level at predetermined time intervals, and simultaneously measuring the temperature of the fluid within the tank.